US006041224A

United States Patent [19]

Wada

[11] Patent Number: 6,041,224

[45] **Date of Patent: *Mar. 21, 2000**

[54] DBS TUNER FOR SATELLITE BROADCASTING RECEIVERS

[75] Inventor: Yasuhiro Wada, Takatsuki, Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/824,123

[22] Filed: Mar. 26, 1997

[30] Foreign Application Priority Data

Apr. 26, 1996 [JP] Japan .................................... 8-107243

[51] Int. Cl.[7] ................................ H04B 1/26; H04B 1/10

[52] U.S. Cl. .......................... 455/327; 455/317; 455/310; 333/204

[58] Field of Search .................................... 455/296, 302, 455/307, 310, 317, 338, 327, 527; 333/204

[56] References Cited

U.S. PATENT DOCUMENTS

| | | | |
|---|---|---|---|
| 3,639,686 | 2/1972 | Walker et al. | 455/527 |
| 3,659,206 | 4/1972 | Hallford | 455/326 |
| 3,662,294 | 5/1972 | Jacobs et al. | 333/33 |
| 4,074,214 | 2/1978 | Aichholzer | 455/327 |
| 4,115,737 | 9/1978 | Hongu et al. | 455/289 |
| 4,491,976 | 1/1985 | Saitoh et al. | 455/315 |
| 5,023,866 | 6/1991 | DeMuro | 30370/24 |
| 5,125,110 | 6/1992 | Nusair | 455/327 |
| 5,159,711 | 10/1992 | Ma et al. | 455/307 |
| 5,202,651 | 4/1993 | Yoshihiko | 333/170 |
| 5,483,206 | 1/1996 | Lohninger | 333/204 |
| 5,487,186 | 1/1996 | Scarpa | 455/192.2 |
| 5,585,330 | 12/1996 | Cadotte, Jr. et al. | 333/99 S |
| 5,603,115 | 2/1997 | Ku | 455/254 |
| 5,659,274 | 8/1997 | Takahashi et al. | 333/204 |
| 5,668,511 | 9/1997 | Furutani et al. | 333/204 |
| 5,691,676 | 11/1997 | Snel et al. | 333/204 |

FOREIGN PATENT DOCUMENTS

| | | |
|---|---|---|
| 317642 | 5/1989 | European Pat. Off. . |
| 58-5001 A | 1/1983 | Japan . |
| 5-160602 | 6/1993 | Japan . |
| 5-304419 | 11/1993 | Japan . |

OTHER PUBLICATIONS

"Design and Packaging of High–Frequency Circuit", by Yukihiko Miyamoto, Japan Broadcast Publishing Co., Ltd., Tokyo, Japan, 3rd Edition, pp. 24–27, Aug. 1, 1989.

*Primary Examiner*—Nguyen Vo
*Assistant Examiner*—Duc Nguyen

[57] ABSTRACT

A DBS tuner for satellite broadcasting receivers, includes an attenuating filter (trap circuitry) composed of a microstrip line having an open-ended load terminal which projects from the RF signal line or the power supply line.

19 Claims, 6 Drawing Sheets

DBS TUNER FOR SATELLITE BROADCASTING RECEIVERS

BACKGROUND OF THE INVENTION (1) Field of the Invention

The present invention relates to a circuit configuration of a DBS tuner for satellite broadcasting receivers, and in particular relates to a DBS tuner for satellite broadcasting receivers wherein an attenuating filter (trapping circuit) using a microstrip line is provided on the printed circuit board.

(2) Description of the Prior Art

In a general satellite broadcasting receiving system, ground waves of the 12 GHz band are collected first by a BS antenna, and a BS converter converts the 12 GHz band frequency into a high-frequency signal of the 1 GHz band (900 to 2150 MHz). This is introduced to a DBS tuner where a desired signal channel is selected from the 1 GHz band signals sent from the BS converter so that the selected signal is converted into the intermediate frequency signal (402.78 MHz). Here, DBS represents direct broadcasting satellite, and means a system which directly receives broadcast signals from communications satellites.

FIG. 1 shows an example of a circuit block diagram of a conventional DBS tuner for satellite broadcasting receivers. The double line connecting different circuit portions represents the RF signal line; the single line represents the power line.

In a conventional DBS tuner, an input signal of the 1 GHz band applied to an input terminal 51 is made to pass through a wideband amplifier or RF circuit portion 52, an attenuator 53, a tracking filter 54 to be supplied to a mixer 55. The locally generated signal from a local oscillator circuit portion 56 is inputted to a PLL (phase-locked loop) 58 through a high-pass filter 57. PLL 58 operates so that the locally generated signal from local oscillator circuit portion 56 is phase-locked. The locally generated signal locked in phase is inputted to mixer 55 where it is converted into the intermediate frequency signal (IF signal). This IF signal is applied to an IF circuit portion 60 and inputted to a demodulating portion 61. A reference numeral 62 designates a power input terminal which is connected to RF circuit portion 52, mixer 55, PLL 58, local oscillator circuit portion 56, IF circuit portion 60 and demodulating portion 61. The frequency of the IF signal output in this case is 402.78 MHz. RF circuit portion 52 and IF circuit portion 60 process a modulated signal. Demodulator 61 detects and demodulates the modulated signal to output it as a detected signal. The RF circuit portion operates so as to adjust the level of the attenuator, which is a circuit provided to keep the signal at a constant level free from distortion even if the level of the RF input signal level varies.

The signal lines connecting various portions, specifically, input terminal 51, RF circuit portion 52, attenuator 53, tracking filter 54, mixer 55, PLL 58, local oscillator circuit portion 56, IF circuit portion 60, power terminal 62 and demodulator 61, is composed of copper foil leads provided on the printed circuit board as shown in FIG. 4. Designated at 65 in FIG. 4 is a dielectric support of the printed circuit board, 66 a signal line and 67 a copper foil layer formed on the underside of the printed circuit board. Signal line 66 is provided in the form of a simple strip-like conductor.

The circuit configuration of the conventional DBS tuner for satellite broadcasting receivers, has a means for preventing leakage of the locally generated signal (including fundamental harmonic, second order harmonic, third order harmonic) from the input terminal. This means is provided as a low-pass filter connected to GND 70 and composed of a chip capacitor 68 and a strip line 69 as shown in FIG. 2, for example, inside RF circuit portion 52 or tracking filter 54 such as λ/2 type band-pass filter (B.P.F) or λ/4 type B.P.F, etc., so as to damp the aforementioned signal.

Further, to prevent leakage of the locally generated signal (including fundamental harmonic, second order harmonic, third order harmonic) from the power supply terminal, a bypass capacitor 71 as shown in FIG. 3 is connected to GND 70 to damp the signal.

In the conventional DBS tuner for satellite broadcasting receivers, in order to prevent entrance of the second and third harmonic components of the locally generated signal from local oscillator circuit 56 into PLL circuit 58, the aforementioned bypass capacitor, for example, is connected between the locally generated signal transmission line and the GND, as shown in FIG. 1, so as to damp the higher harmonic components.

As a technique for preventing entrance of the higher harmonic components of the VCO oscillating signal into the demodulator, the aforementioned bypass capacitor is connected between a RFAGC line 59 and GND (earth) to damp the higher harmonics. RFAGC line 59 is a high-frequency line which connects attenuator 53 with demodulator 61.

Concerning prevention of leakage of the locally generated signal from the high-frequency input terminal, it is possible in the prior art to sufficiently attenuate the fundamental wave, but it is impossible to damp the higher frequency ranges, i.e., the second and third order harmonics, causing leakage from the high-frequency input terminal. This can be attributed to the increase in the inductance component of the leads and electrodes of the chip capacitor constituting the filter, accompanied by the augmentation of the frequencies of the second and third order harmonics. It is also attributed to a change in the inductance components of the strip lines depending upon frequencies. The leakage of the locally generated signal from the high-frequency input terminal will cause interference in the reception of other DBS tuners connected to the common cable and other appliances.

Here, the fundamental wave of the locally generated signal of DBS tuners for satellite broadcasting receivers is within 1300 MHz to 2550 MHz. The frequency of its second order harmonic falls within (1300 MHz to 2550 MHz)×2 and the frequency of its third order harmonic falls within (1300 MHz to 2550 MHz)×3.

The frequency of the fundamental wave of the VCO oscillating signal is 402.78 MHz. The frequency of its second order harmonic is 402.78 MHz×2, and the frequency of its third order harmonic is 402.78 MHz×3.

Concerning the protection against interference caused by the second and third order harmonics of the locally generated signal inputted from the local oscillator circuit to the PLL circuit portion, in the prior art, since the self-resonance frequency (about 1 GHz) of the bypass capacitor (of, e.g., about 1000 pF) is lower than the frequency of the locally generated signal (about 1300 MHz to 2550 MHz), the inductance of the leads and electrodes of the chip capacitor is consequently large so that it is impossible to sufficiently attenuate the signal component to the GND (earth).

Thus, various causes give rise to a problem that the harmonic components enter the PLL circuit, resultantly, the conventional configuration suffers from malfunction of channel section in the PLL circuit.

Concerning the protection against the leakage of the locally generated signal (including fundamental harmonic, second order harmonic, third order harmonic) from the power supply terminal, in the prior art, the leakage of the aforementioned signal causes unwanted radiation from the appliance incorporating the DBS tuner.

Concerning the protection against interference caused by the VCO oscillating signal harmonic components from the demodulating circuit portion through the RFAGC line, the prior art technology cannot sufficiently attenuate them because of the augmentation of the inductance component in the aforementioned bypass capacitor. Therefore, if the receiver receives a RF signal having a frequency (about 1.2 GHz, 1.6 GHz, 2.0 GHz) which is close to the VCO oscillating signal harmonics, the aforementioned harmonic components cause beats if it returns to the RF signal line.

SUMMARY OF THE INVENTION

It is therefore an object of the present invention to provide a DBS tuner for satellite broadcasting receivers wherein an attenuating filter (trap circuitry) for preventing leakage of the locally generated signal (containing its higher harmonics) or leakage of the VOC oscillating signal (containing its higher harmonics) is provided.

The present invention has been devised in order to attain the above object, and is configurated as follows:

In accordance with the first aspect of the invention, a DBS tuner for satellite broadcasting receivers, comprises an attenuating filter composed of a microstrip line having an open-ended load terminal which projects from the RF signal line or the power supply line.

Next, the second aspect of the invention resides in the DBS tuner for satellite broadcasting receiver having the above first feature, wherein the attenuating filter is configured with a plurality of microstrip lines different in length having a plurality of open-ended load terminals.

The third aspect of the invention resides in the DBS tuner for satellite broadcasting receiver having the above first feature, wherein the attenuating filter is configured so that a GND pattern is formed almost entirely on the dielectric substrate on the side opposite to the surface where the microstrip lines are formed.

The fourth aspect of the invention resides in the DBS tuner for satellite broadcasting receiver having the above first feature, wherein the attenuating filter is provided in the RF line which connects the input terminal to the DBS tuner for broadcasting receivers with the local oscillator circuit portion.

The fifth aspect of the invention resides in the DBS tuner for satellite broadcasting receivers having the above second feature, wherein the attenuating filter is provided in the RF line which connects the input terminal to the DBS tuner for broadcasting receivers with the local oscillator circuit portion.

The sixth aspect of the invention resides in the DBS tuner for satellite broadcasting receivers having the above first feature, wherein the attenuating filter is provided in the power supply line inside the DBS tuner for broadcasting receivers.

The seventh aspect of the invention resides in the DBS tuner for satellite broadcasting receivers having the above second feature, wherein the attenuating filter is provided in the power supply line inside the DBS tuner for broadcasting receivers.

The eighth aspect of the invention resides in the DBS tuner for satellite broadcasting receivers having the above first feature, wherein the attenuating filter is provided between the demodulating portion of the DBS tuner for broadcasting receivers and the attenuator.

The ninth aspect of the invention resides in the DBS tuner for satellite broadcasting receivers having the above second feature, wherein the attenuating filter is provided between the demodulating portion of the DBS tuner for broadcasting receivers and the attenuator.

The tenth aspect of the invention resides in the DBS tuner for satellite broadcasting receivers having the above first feature, wherein the attenuating filter is provided in the transmission line for the locally generated signal from the local oscillator circuit portion to the PLL circuit portion in the DBS tuner for satellite broadcasting tuner.

Finally, the eleventh aspect of the invention resides in the DBS tuner for satellite broadcasting receivers having the second feature, wherein the attenuating filter is provided in the transmission line for the locally generated signal from the local oscillator circuit portion to the PLL circuit portion in the DBS tuner for satellite broadcasting tuner.

DESCRIPTION OF THE PREFERRED EMBODIMENTS

FIGS. 5 through 10 show embodiments of the invention. The present invention will be described in detail with reference to the embodiments shown.

Figure 8:
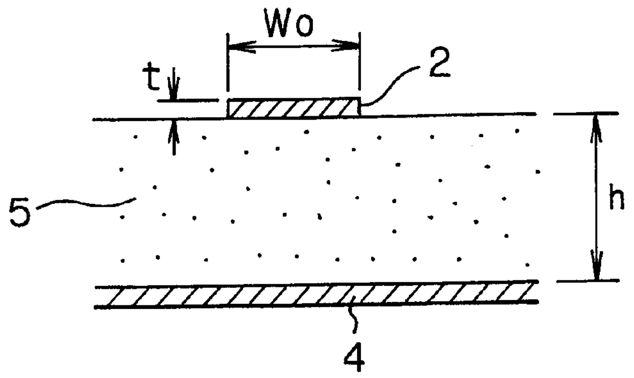
FIG. 8 is a sectional view showing a printed circuit board.
Figure 9:
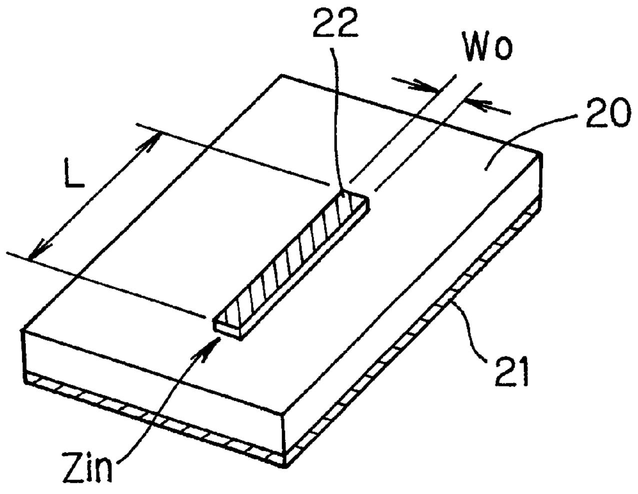
FIG. 9 is a perspective view showing a microstrip line provided on a printed circuit board in accordance with an embodiment of the invention.
Figure 10:
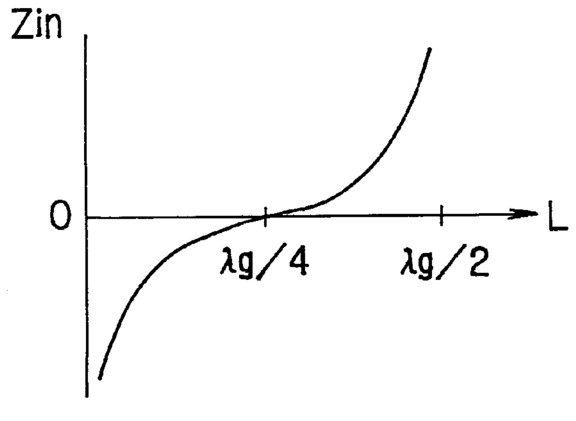
FIG. 10 is a chart showing the relationship between the length L of the microstrip line provided on the printed circuit board in accordance with an embodiment of the invention and the input impedance Zin with respect to the signal line.

Referring first to FIGS. 8, 9 and 10, description will be made of the operational principle of the subject invention, i.e., a microstrip line having an open-ended load terminal. FIG. 8 is a sectional view of a printed circuit board; FIG. 9 is a pattern model on the actual board; and FIG. 10 is a chart showing the characteristics.

In FIG. 8, designated at 5 is a dielectric substrate for the printed circuit board. The hard printed circuit board (PWB) is about 0.5 to 1.5 mm in thickness (h). Reference numerals 2 and 4 are copper foil layers of about 18 to 35 m thick, coated on both sides of the substrate. The substrate is almost entirely covered on its lower side by copper foil layer 4 while the one on the upper side, copper foil layer 2 forms a microstrip line or band with a line width Wo of about 0.2 to 2.0 mm.

Coated on the microstrip line is a solder resist. The effect of the solder resist is to protect the conductor from corrosion and prevent solder from adhering. The input impedance Zin with respect to the signal line in the configuration of FIG. 9, is represented by the following formula:

$$Zin=-j\times Zo\times cot\beta L \quad (1)$$

where Zo is the characteristic impedance of microstrip line 2, β is a phase constant and L is the length of microstrip line.

Here, Zin becomes equal to 0 (Zin=0 (Ω)) for the signal having a frequency meeting the following equation, which is equivalent to an input terminal being grounded:

$$L=(2n+1)\ \lambda g/4 \text{ (n is an integer)} \quad (2)$$

where λg represents the wavelength of a signal in the transmission line length. The present invention, from this view point, provides a microstrip line serving as an attenuating filter (i.e., a trap circuitry) for the printed circuit board of a DBS tuner for satellite broadcasting receivers.

Now, detailed description will be made of the attenuating filter (trap circuitry) formed of a microstrip line which is provided in the RF line, having an open-ended load terminal. When a microstrip line has a shape shown in FIG. 9, Wheeler's formula for determining the characteristic impedance Zo of the microstrip line is given as follows:

$$Zo=42.4/(\epsilon+1)^{1/2}\times 1n(1+(4\times h/W)\times(b+(b^2+a\times\pi^2)^{1/2})) \quad (3)$$

where W=Wo+a×ΔWo $\Delta Wo=t/\pi(1+1n(4/((t/h)^2+(1/(\pi\times(Wo/t+1.1)))^2)^{1/2}))$ $a=(1+1/\epsilon)/2$ $b=(14+8/\epsilon)/11\times 4\times h/W$ ε: dielectric constant on the substrate Wo : microstrip line width h: thickness of the dielectric substrate t: microstrip line thickness In a microstrip line, part of the electric field leaks out into the air. This can be considered to be equivalent to reducing the dielectric constant of the dielectric substrate. This effective dielectric constant $\epsilon_{eff}$ is given from the Wheeler's formula, as follows:

$$\epsilon_{eff}=\epsilon-(\epsilon-\epsilon_{effo})/(1+G(f/f_p)^2) \quad (4)$$

where G=0.6+0.009×Zo (Zo: Ω)

$f_p=Zo/(0.80\times\pi\times h)$ (h: mm)

$\epsilon_{effo}=(Zoo/Zo)^2$ f: the frequency in use [GHz]

Zoo: the characteristic impedance when the dielectric substrate is removed.

These formulae (3) and (4) are cited from 'Design and packaging of high-frequency circuit' pp. 26–27 (Yukihiko Miyamoto, published by Japan Broadcast Publishing Co., Ltd. the third edition, printed in 1989).

Further, the following relationship between the frequency and the wavelength holds:

$$\lambda g=C/(f\times(\epsilon_{eff})^{1/2}) \quad (5)$$

$C=2.998\times10^{10}$ cm/sec (C=the velocity of light)

From the above, when, for instance, the third order harmonic range in the locally generated signal, i.e., the 5 GHz band, needs be damped, the dimensions is set so that the width of the microstrip line is 0.4 mm, the dielectric constant is set to be ε=3.8 (when the material of the printed circuit board is made of glass epoxy, for instance), the thickness t of the microstrip line is 0.018 mm (or 18 μm) and the thickness h of the dielectric substrate is 1 mm. In this case, the length of the microstrip line L=λg/4 is calculated as L=9.2 mm from the formulae (2), (3) and (4). If the second order harmonic range in the locally generated signal, i.e., the 3.2 GHz band is wanted to be damped, the length of the microstrip line is determined from the above coefficients, to be L≈14.5 mm.

Further, the length of microstrip line 2 is set so that L=λkg/4 holds for the frequency to be attenuated. The line width Wo of microstrip line 2 is related to the band width to be trapped, and it is possible to increase the band width, as the line width Wo is increased. In formula (1), β (phase constant) is a function of the frequency, the rate of change in the value of Zin is determined depending on the value Zo. Now, if the line width Wo is increased, Zo will change, becoming smaller. Accordingly, the change of rate of Zin for the frequency becomes smaller. Hence, a broadening of the band width can be achieved.

FIG. 10 is a chart showing the relationship between the characteristic impedance Zin with respect to the signal source side and the length L of microstrip line 2. From this chart it is understood: when L=(2n+1)λg/4, then Zin =0; and when L=(2n+1)λg/2, then Zin=∞ (infinity).

Figure 5:
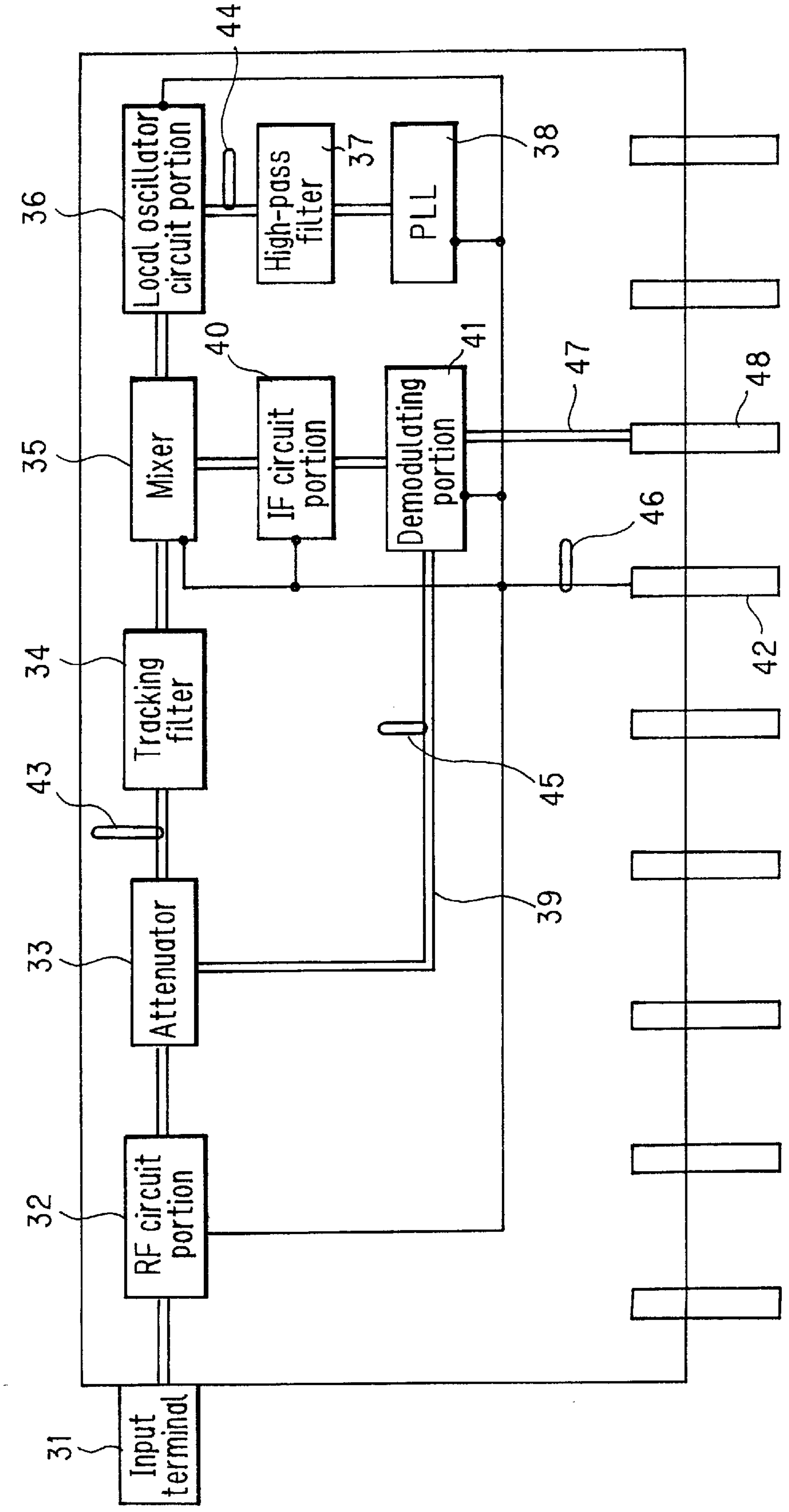
FIG. 5 is a block diagram showing a circuit of a DBS tuner for satellite broadcasting receivers in accordance with an embodiment of the invention.

FIGS. 6A, 6B and FIGS. 7A–7C show embodiments of the invention in which one or two microstrip lines each having an open-ended load terminal are provided based on the above theory. FIG. 5 is a block diagram showing a DBS tuner for satellite broadcasting receivers to which the embodiment is applied.

Figure 6A:
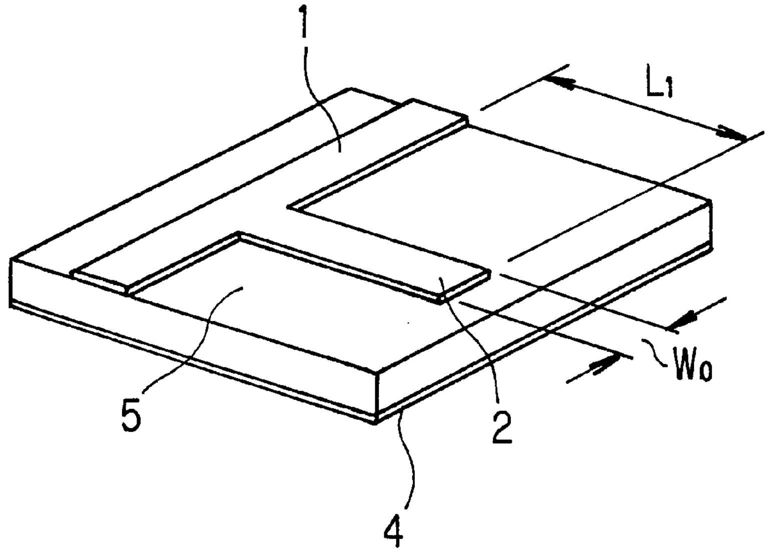
FIG. 6A is a perspective view showing a pattern model of an attenuating filter composed of a single microstrip line having an open-ended load terminal, in a DBS tuner for satellite broadcasting receivers in accordance with an embodiment of the invention.

In FIG. 6A, a signal line 1 is formed with a single microstrip line 2 having an open-ended load terminal. The length of this microstrip line 2 is designed so that $L1=\lambda g_1/4$ holds for a frequency f1 to be attenuated.

Figure 6B:
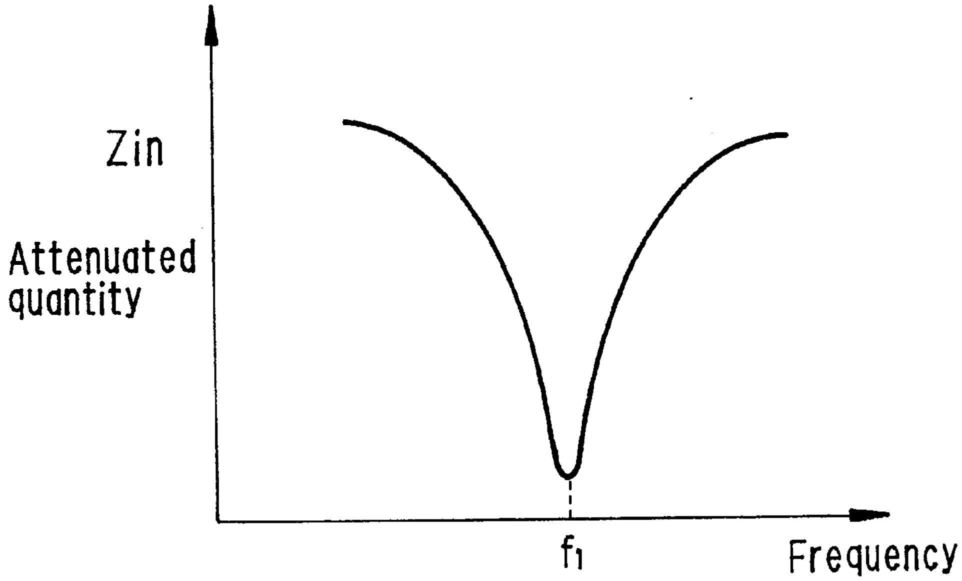
FIG. 6B is a chart showing the relationship between the frequency and the input impedance Zin in the configuration of FIG. 6A.

FIG. 6B is a graph showing the transmission characteristic of signal line 1, plotting the input impedance Zin or the attenuated quantity vs. frequency along the horizontal axis. In the case of the input impedance Zin, it represents the input impedance Zin of a stub with respect to signal line 1.

Figure 7A:
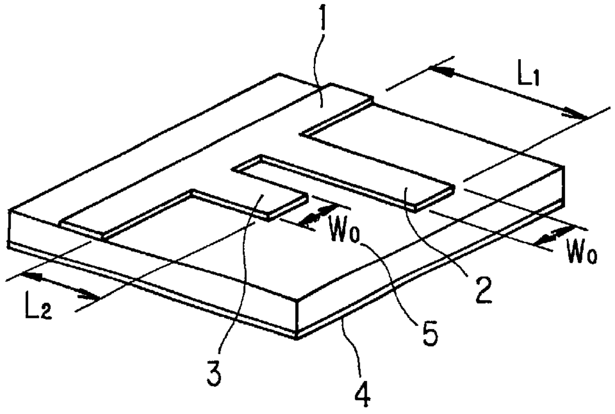
FIG. 7A is a perspective view showing a pattern model of an attenuating filter composed of a plurality of microstrip lines having open-ended load terminals in a DBS tuner for satellite broadcasting receivers in accordance with an embodiment of the invention.

In FIG. 7A, two microstrip lines 2 and 3 having open-ended load terminals are designed and provided for the signal line to attenuate two frequencies f1 and f2. In this case, the lengths are set so that $L1=kg_1/4$ and $L2=\lambda g_2/4$ hold. In this case, in one embodiment, when f1=4.8 GHz, then L1=9.2 mm; and when f2=3.2 GHz, then L2=14.5 mm. The line width of signal line 1 is set at 0.4 mm; the line width Wo of the microstrip lines is set at 0.4 mm; and the thickness t of the copper foil is 18 μm.

Figure 7B:
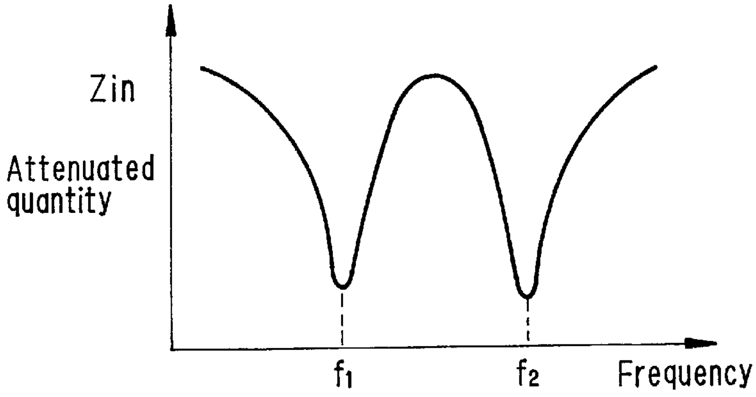
FIG. 7B is a chart showing the relationship between the frequency and the input impedance Zin in the configuration of FIG. 7A in which two microstrip lines different in length are provided.
Figure 7C:
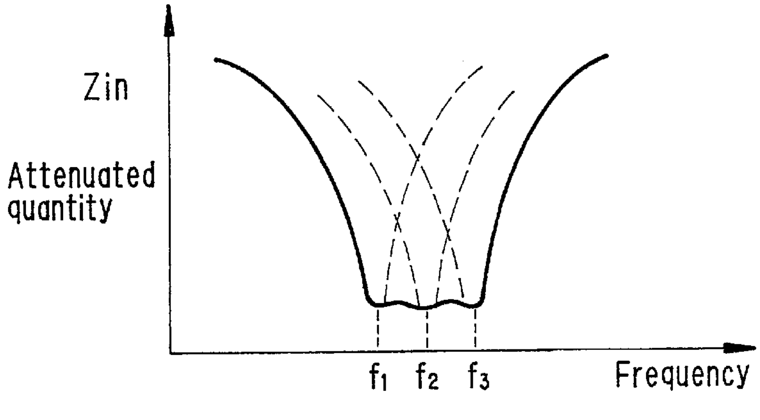
FIG. 7C is a chart showing the relationship between the frequency and the input impedance Zin in the configuration of FIG. 7A in which a plurality of microstrip lines different in length are provided.

FIG. 7B is a graph showing the relationship between frequencies f1 and f2 vs. the input impedance Zin or the attenuated quantity. Here, L1>L2, f1<f2. A plurality of microstrip lines different in length are provided. The lengths are set with L1>L2>L3 . . . >Ln, and the frequencies to be attenuated becomes f1<f2<f3<. . . <fn. When the values f1, f2, f3, . . . , fn are selected close to each other, it is possible to reduce the value of the input impedance Zin (or increase the attenuated quantity) in a broader frequency band range. This is shown in FIG. 7C.

In FIG. 7B, a case comprising a plurality of microstrip lines different in length was described. It is also possible to provide a plurality of microstrip lines having almost the same length. This setup can increase the attenuating level for the frequency to be attenuated.

FIG. 5 is a block diagram showing a circuit of a DBS tuner for satellite broadcasting receivers in accordance with an embodiment of the invention. The double line connecting different circuit portions represents the high-frequency signal line; the signal line represents the power line.

In FIG. 5, the input signal of the 1 GHz band applied to an input terminal 31 is made to pass through a wide-band a RF circuit portion 32, an attenuator 33, a tracking filter 34 to be supplied to a mixer 35. The locally generated signal from a local oscillator circuit portion 36 is inputted to a PLL (phase-locked loop) 38 through a high-pass filter 37. PLL 38 operates so that the locally generated signal (1300 MHz to 2550 MHz) from local oscillator circuit portion 36 is phase-locked. The locally generated signal locked in phase is inputted to mixer 35 where it is converted into the intermediate frequency signal (IF signal). This IF signal is applied to an IF circuit portion 40 and inputted to a demodulating portion 41. The signal demodulated is inputted into an output terminal 48 through a signal output line 47. A reference numeral 42 designates a power input terminal which is connected to RF circuit portion 32, mixer 35, PLL 38, local oscillator circuit portion 36, IF circuit portion 40 and demodulating portion 41. The frequency of the IF signal output in this case is 402.78 MHz.

Figure 1:
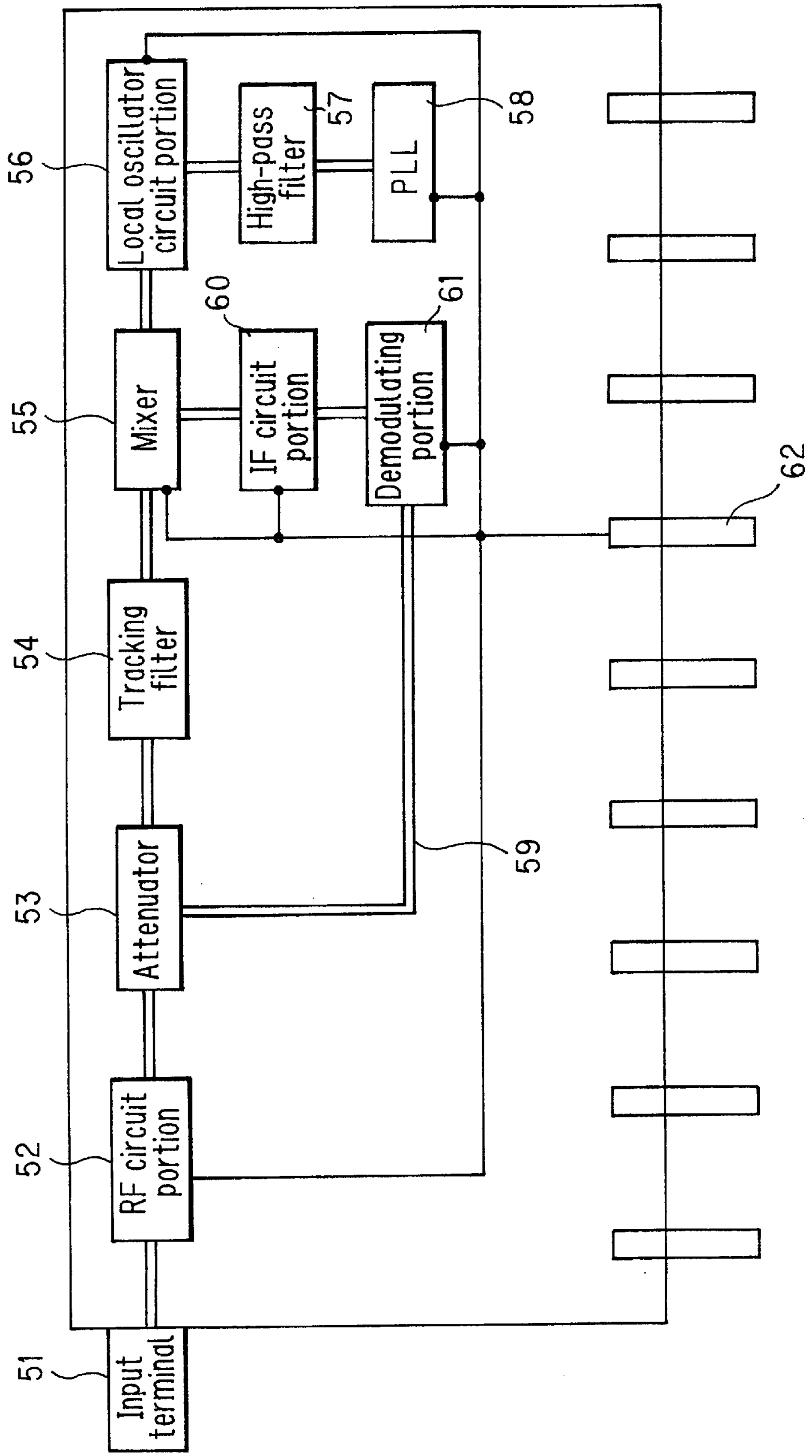
FIG. 1 PRIOR ART
FIG. 1 is a block diagram showing a circuit of a conventional DBS tuner for satellite broadcasting receivers.
Figure 2:
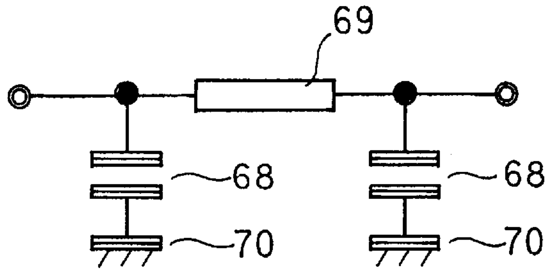
FIG. 2 PRIOR ART
FIG. 2 is a circuit diagram showing the configuration of a low-pass filter according to the prior art.
Figure 3:
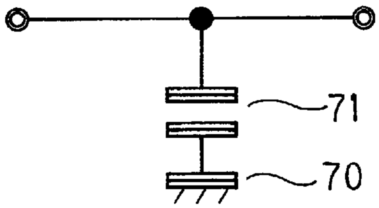
FIG. 3 PRIOR ART
FIG. 3 is a circuit diagram showing a bypass capacitor according to the prior art.
Figure 4:
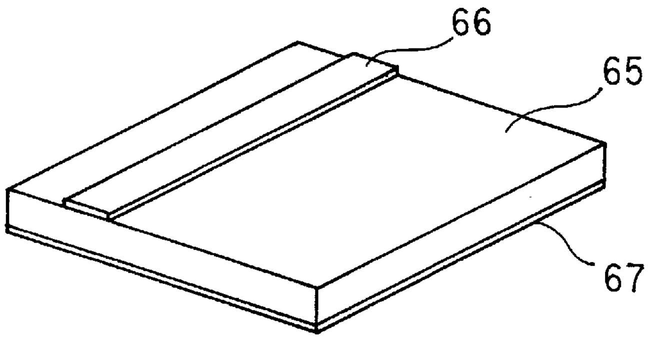
FIG. 4 PRIOR ART
FIG. 4 is a perspective view showing a RF signal line of a conventional DBS tuner for satellite broadcasting receivers.

Here, the distinction of the invention shown in FIG. 5 from the configuration of FIG. 1 resides in that one or more microstrip lines with an open-ended load terminal are provided in the high-frequency signal line. In FIG. 5, as an example, attenuating filters (trap circuitry) 43, 44, 45 and the like made up of microstrip lines with open-ended load terminals are provided between attenuator 33 and tracking filter 34, between local oscillator circuit 36 and bypass filter 37, and between demodulating portion 41 and attenuator 33, and the like. Attenuating filter (trap circuitry) 45 is typically provided in RFAGC line 39.

Another attenuating filter (trap circuitry) 46 made up of a microstrip line with an open-ended load terminal is provided between interconnections from power input terminal 42 to RF circuit portion 32, mixer 35, PLL 38, local oscillator circuit portion 36, IF circuit portion 40 and demodulating portion 41.

Here, the frequency of the fundamental wave of the locally generated signal is from 1300 MHz to 2550 MHz. The frequency of its second order harmonic falls within (1300 MHz to 2550 MHz)×2 and the frequency of its third order harmonic falls within (1300 MHz to 2550 MHz)×3.

The frequency of the fundamental wave of the VCO oscillating signal is 402.78 MHz. The frequency of its second order harmonic is 402.78 MHz×2, and the frequency of its third order harmonic is 402.78 MHz×3.

Trap circuitry 43 is so designed that the microstrip line mainly damps the second and third order harmonics of the fundamental wave ranging from 1300 to 2550 MHz. Trap circuit 44 is so designed that it mainly damps the second and third order harmonics of the fundamental wave of 402.78 MHz. Trap circuitry 45 is so designed that it mainly damps the second and third order harmonics of the fundamental wave ranging from 1300 to 2550 MHz. Trap circuitry 46 provided for the power input line is designed so as to target the fundamental frequency ranging from 1300 to 2550 MHz and the fundamental wave of 402.78 MHz of the VCO oscillating signal. Trap circuitry 46 may optionally target the second and third order harmonics of these waves.

Although in the above example, an attenuating filter (trap circuitry) was provided in the RF signal line, it may be provided in any location from the input terminal to the local oscillator circuit. Although in the above example, the width of the microstrip line was set at 0.4 mm, the width should not be limited to this but can be changed as appropriate. Although in the above example, the length of the microstrip line was set so that L=λg/4 for the frequency to be damped, the length may be set equal to (2n +1)λg/4(n is an integer). In this embodiment, the intermediate frequency was set at 402.78 MHz, however, it can be set at a frequency of 479.5 MHz. In this case, apparently the fundamental wave of the locally generated signal ranges from 1379.5 MHz to 2629.5 MHz; the fundamental wave of the VCO oscillating signal becomes equal to 479.5 MHz. In this setup, the RF frequencies generating beats fall at 959 MHz, 1438.5 MHz and 1909 MHz. The RF frequency was described to be 900 to 2150 MHz, but it should not be limited to this range. Further, the frequencies to be damped were described up to the third order harmonic component, but they are not limited to this.

Thus, in accordance with the first aspect of the invention, in the DBS tuner for satellite broadcasting receivers, a microstrip line having an open-ended load terminal is provided in the RF signal line or the power supply line so that it projects from the line forming an attenuating filter (trap circuitry). Thus, it becomes possible to attenuate signals of high frequency ranges, which were hard to handle, by simply changing the circuit pattern during the manufacture of the DBS tuner. Consequently, it is possible to suppress the interference of the DBS tuner with other DBS tuners connected with the same cable and other appliances, to prevent malfunction of channel section in the PLL from occurring, to reduce unwanted radiation from the appliance body incorporating the DBS tuner, and to suppress generation of beats on the display screen when the RF frequency received is close to the frequency of a higher harmonic of the VOC oscillating signal. Since this circuit pattern can be formed on the printed circuit board, it is possible to achieve this without any increase in cost.

In accordance with the second feature of the invention, the attenuating filter is configured with a plurality of microstrip lines different in length having a plurality of open-ended load terminals. This configuration enables effective attenuation of different frequencies.

In accordance with the third aspect of the invention, the attenuating filter is configured so that a GND pattern is formed almost entirely on the dielectric substrate on the side opposite to the surface where the microstrip lines are formed. This configuration makes the distribution of the electric field formed between the microstrip lines and GND pattern uniform, thus simplifying the design of the attenuating filter.

In accordance with the fourth and fifth aspects of the invention, the aforementioned attenuating filter is provided in the RF line which connects the input terminal to the DBS tuner for broadcasting receivers with the local oscillator circuit portion. Therefore, it is possible to prevent the leakage of the locally generated signal through the input terminal. Accordingly, the tuner of the invention will not interfere with other DBS tuners which are connected through the same cable as well as other appliances.

In accordance with the sixth and seventh aspects of the invention, the aforementioned attenuating filter is provided in the power supply line inside the DBS tuner for broadcasting receivers. Therefore, it is possible to prevent leakage of the locally generated signal through the power terminal. Accordingly, it is possible to eliminate unwanted radiation from the appliance body almost to nothing.

In accordance with the eighth and ninth aspects of the invention, the aforementioned attenuating filter is provided between the demodulating portion of the DBS tuner for broadcasting receivers and the attenuator (or in the RFAGC line), it is possible to prevent entrance of the higher harmonic components from the VCO oscillating signal in the demodulating circuit portion into the RFAGC line. This makes it possible to reduce generation of beats on the display screen when the RF frequency received is close to the frequency of a higher harmonic of the VOC oscillating signal.

In accordance with the tenth and eleventh aspects of the invention, the attenuating filter is provided in the transmission line for the locally generated signal from the local oscillator circuit portion to the PLL circuit portion in the DBS tuner for satellite broadcasting tuners. This configuration prevents entrance of the second order and third order harmonic components of the locally generated signal into the PLL circuit portion. Accordingly, it is possible to prevent malfunction of channel section in the PLL.

What is claimed is:

1. A receiver for a direct broadcasting satellite transmission comprising:

an attenuating filter including a microstrip transmission line having an open-ended load terminations directly projecting from the transmission line the load terminations having different lengths including a shorter length tuned to a third harmonic of a locally generated signal and a longer length tuned to a second harmonic of the locally generated signal;

a tuner assembly for receiving an input signal at an input terminal, the tuner assembly providing a radio frequency path for the input signal, wherein the attenuating filter is coupled into said radio frequency path;

a phase-locking circuit; and a local oscillator coupled to the phase-locking circuit, the attenuating filter being provided in the radio frequency transmission path for the locally generated signal from the local oscillator to the phase-locking circuit to attenuate leakage of the second and the third harmonic of the locally generated signal associated with the input terminal.

2. A receiver according to claim 1, wherein the open-ended terminations are tuned to offset frequencies from each other to cooperatively yield an aggregate notch frequency response having a continuous bandwidth about the first harmonic or the second harmonic.

3. A receiver according to claim 1, wherein the attenuating filter further comprises a dielectric substrate adjoining the transmission line and a ground plane on the substrate formed almost entirely on the dielectric substrate on a side opposite to the the microstrip transmission line.

4. A receiver for a direct broadcasting satellite transmission comprising:

a mixer;

a local oscillator for generating a locally generated signal for input to the mixer;

an attenuating filter including a microstrip transmission line having an open-ended load terminations directly projecting from the transmission line, the load terminations having different lengths including a shorter length tuned to a third harmonic of the locally generated signal and a longer length tuned to a second harmonic of the locally generated signal; and a tuner assembly for receiving an input signal at an input terminal, the tuner assembly providing a radio frequency path for the input signal, wherein the attenuating filter is coupled into said radio frequency path to attenuate at least the second and third harmonics in accordance with a notch frequency response, the radio frequency path defined between an input terminal of the tuner and the mixer.

5. A receiver according to claim 4, wherein the tuner assembly further comprises a demodulating portion, an attenuator, and a second attenuating filter being provided between the demodulating portion and the attenuator.

6. A receiver for a direct broadcasting satellite transmission comprising:

an attenuating filter including a microstrip transmission line having an open-ended load termination directly projecting from the transmission line; and a tuner for receiving an input signal, the tuner providing a radio frequency path for the input signal, wherein the attenuating filter is coupled into said radio frequency path to attenuate at least one unwanted signal, related to the input signal, in accordance with a notch frequency response; and a power supply line for powering the tuner, the attenuating filter being provided in the power supply line.

7. The receiver according to claim 6, wherein the attenuating filter includes a plurality of open-ended load terminations extending from the transmission line, the open-ended terminations being tuned to offset frequencies from each other to cooperatively yield an aggregate notch frequency response having a continuous bandwidth.

8. A receiver for a direct broadcasting satellite transmission comprising:

a local oscillator for generating a fundamental frequency signal, the local oscillator incidentally generating a second harmonic and a third harmonic of the fundamental frequency signal:

an attenuating filter including a microstrip transmission line having an open-ended load terminations directly projecting from the transmission line, the load terminations having different lengths including a shorter length tuned to the third harmonic and a longer length tuned to a second harmonic; and a tuner assembly for receiving an input signal, the tuner assembly providing a radio frequency path for the input signal, wherein the attenuating filter is coupled into said radio frequency path to attenuate the second and the third harmonic in accordance with a notch frequency response, the tuner assembly including a demodulating portion and an attenuator, the attenuating filter being coupled into the radio frequency path between the demodulating portion and the attenuator.

9. A receiver according to claim 8 further comprising a second attenuating filter provided in the radio frequency path connecting an input terminal of the tuner with a mixer of the tuner.

10. A receiver according to claim 8, further comprising a second attenuating filter provided in the radio frequency path connecting an input terminal of the tuner with the local oscillator.

11. A tuner for a satellite receiver comprising:

a radio frequency circuit for receiving an input signal at a receive frequency and amplifying the input signal to yield an amplified signal;

a local oscillator for generating an oscillator signal at a local oscillator frequency offset from the input signal, the local oscillator incidentally generating a second harmonic and a third harmonic of the local oscillator frequency;

a mixer for mixing the oscillator signal and the input signal to yield an intermediate signal at an intermediate frequency;

a demodulator for demodulating the intermediate signal into a detected signal;

a phase locking circuit coupled to the local oscillator;

a microstrip filter for filtering at least one of said signals, the filter comprising a transmission line and an open-ended terminations extending directly from the transmission line, the load terminations having different lengths including a shorter length tuned to the third harmonic and a longer length tuned to the second harmonic to filter in accordance with a notch frequency response, the microstrip filter being coupled between the local oscillator and the phase-locking circuit.

12. The tuner according to claim 11 wherein each open-ended termination comprises an approximately one-quarter wavelength stub at the second harmonic or the third harmonic frequency to attenuate the harmonic frequency with the notch frequency response.

13. The tuner according to claim 11 wherein each open-ended termination extends orthogonally from the transmission line for one-quarter of a wavelength at the first harmonic or the second harmonic frequency to attenuate the harmonic frequency with the notch frequency response.

14. The tuner according to claim 11 wherein an additional open-ended termination extends from the transmission line, the additional open-ended termination being tuned to a harmonic frequency of the intermediate frequency signal.

15. The tuner according to claim 11 wherein additional open-ended terminations extend from the transmission line, said open-ended terminations and said additional open-ended terminations tuned to offset frequencies from each other to cooperatively yield the notch frequency response having a continuous bandwidth.

16. A tuner for a satellite receiver comprising:

a radio frequency circuit for receiving an input signal at a receive frequency and amplifying the input signal to yield an amplified signal;

a local oscillator for generating an oscillator signal at a local oscillator frequency offset from the input signal, the local oscillator incidentally generating a second harmonic and a third harmonic of the local oscillator frequency;

a mixer for mixing the oscillator signal and the input signal to yield an intermediate signal at an intermediate frequency;

a demodulator for demodulating the intermediate signal into a detected signal;

a microstrip filter for filtering at least one of said signals, the filter comprising a transmission line and an open-ended terminations extending directly from the transmission line, the load terminations having different lengths including a shorter length tuned to the third harmonic and a longer length tuned to the second harmonic to filter in accordance with a notch frequency response;

an attenuator adapted for attenuating the amplified signal prior to providing the amplified signal to the mixer if the amplified signal has excessive signal strength; and a tracking filter, coupled to the attenuator, for filtering the amplified signal for the mixer, the microstrip filter being coupled between the attenuator and the tracking filter.

17. A tuner for a satellite receiver comprising:

a radio frequency circuit for receiving an input signal at a receive frequency and amplifying the input signal to yield an amplified signal;

a local oscillator for generating an oscillator signal at a local oscillator frequency offset from the input signal, the local oscillator incidentally generating a second harmonic and a third harmonic of the local oscillator frequency;

a mixer for mixing the oscillator signal and the input signal to yield an intermediate signal at an intermediate frequency;

a demodulator for demodulating the intermediate signal into a detected signal;

a microstrip filter for filtering at least one of said signals, the filter comprising a transmission line and an open-ended terminations extending directly from the transmission line, the load terminations having different lengths including a shorter length tuned to the third harmonic and a longer length tuned to the second harmonic to filter in accordance with a notch frequency response;

an attenuator adapted for attenuating the amplified signal prior to providing the amplified signal to the mixer if the amplified signal has excessive strength; and a tracking filter, coupled to the attenuator, for filtering the amplified signal for the mixer, the microstrip filter being coupled between the attenuator and the demodulator.

18. A tuner for a satellite receiver comprising:

a radio frequency circuit for receiving an input signal at a receive frequency and amplifying the input signal to yield an amplified signal;

a local oscillator for generating an oscillator signal at a local oscillator frequency offset from the input signal;

a mixer for mixing the oscillator signal and the input signal to yield an intermediate signal at an intermediate frequency;

a demodulator for demodulating the intermediate signal into a detected signal;

a microstrip filter circuit for filtering at least one of said signals, the filter comprising a transmission line and an open-ended termination extending directly from the transmission line to filter in accordance with a notch frequency response;

an attenuator adapted for attenuating the amplified signal prior to providing the amplified signal to the mixer if the amplified signal has excessive strength; and a tracking filter, coupled to the attenuator, for filtering the amplified signal for the mixer;

a power input terminal for providing power to the mixer, the microstrip filter being coupled between the power input terminal and the mixer.

19. A tuner for a satellite receiver comprising:

a radio frequency circuit for receiving an input signal at a receive frequency and amplifying the input signal to yield an amplified signal;

a local oscillator for generating an oscillator signal at a local oscillator frequency offset from the input signal;

a mixer for mixing the oscillator signal and the input signal to yield an intermediate signal at an intermediate frequency;

a demodulator for demodulating the intermediate signal into a detected signal;

an intermediate frequency circuit coupled to the mixer;

a microstrip filter circuit for filtering at least one of said signals, the filter comprising a transmission line and an open-ended termination extending directly from the transmission line to filter in accordance with a notch frequency response; and an attenuator adapted for attenuating the amplified signal prior to providing the amplified signal to the mixer if the amplified signal has excessive strength; and a tracking filter, coupled to the attenuator, for filtering the amplified signal for the mixer, a power input terminal for providing power to the intermediate frequency circuit, the filter being coupled between the intermediate circuit and the power input terminal.

* * * * *